United States Patent Office 3,639,388
Patented Feb. 1, 1972

---

3,639,388
TRIDESOXYPYRANOSIDES AND PROCESS FOR THEIR MANUFACTURE
Werner Haede and Ulrich Stache, Hofheim, Taunus, Werner Fritsch, Neuenhain, Taunus, and Kurt Radscheit, Kelkheim, Taunus, Germany, assignors to Farbwerke Hoechst Aktiengesellschaft vormals Meister Lucius & Bruning, Frankfurt am Main, Germany
No Drawing. Filed Apr. 2, 1969, Ser. No. 812,905
Claims priority, application Germany, Apr. 6, 1968, P 17 68 164.0
Int. Cl. C07c 173/00
U.S. Cl. 260—210.5
8 Claims

ABSTRACT OF THE DISCLOSURE

2′,3′,4′-tridesoxypyranosides of the formula

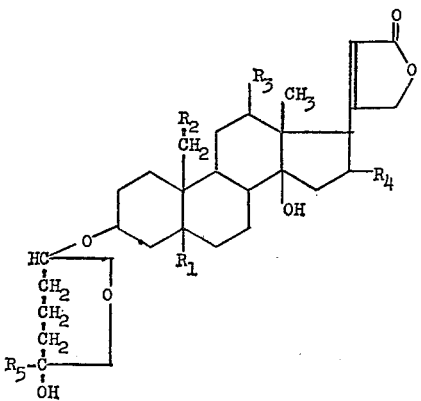

wherein $R_1$, $R_2$, $R_3$, and $R_4$ are each hydrogen or hydroxy and $R_5$ is lower alkyl. The method of making the same by reaction of LiAlH$_4$ with a corresponding 2′-alkyl-2′-carboalkoxytetrahydropyranyl ether having a methyl, hydroxymethylene, or formyl group in the 10-position.

---

The present invention relates to a 2′,3′,4′-tridesoxypyranoside of the general formula

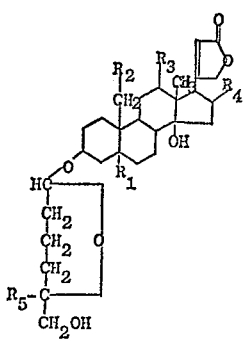

wherein $R_1$, $R_2$, $R_3$ and $R_4$ each represent hydrogen or hydroxy and $R_5$ is lower alkyl.

Furthermore, the present invention relates to a process for the manufacture of a compound of the general Formula I

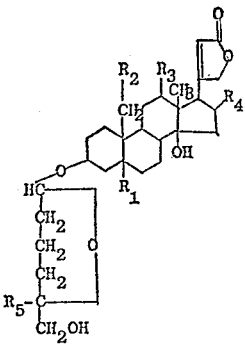

wherein $R_1$ to $R_5$ have the meanings indicated above, which comprises reacting a 2′-alkyl-2′-carboalkoxy-tetrahydropyranyl ether of the general formula

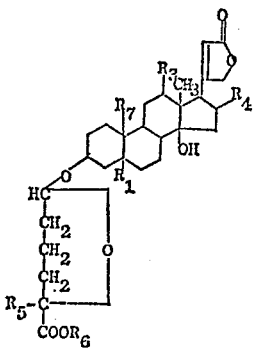

wherein $R_1$, $R_3$, $R_4$ and $R_5$ each have the meanings indicated above, $R_6$ is a lower alkyl and $R_7$ is methyl, hydroxymethylene or formyl, at low temperatures with LiAlH$_4$.

The tetrahydropyranyl ethers serving as starting material are produced from 3-hydroxy steroids by reacting the latter with corresponding dihydropyran derivatives in the presence of an acid catalyst. The alkyl radical $R_5$ preferably contains from 1 to 3 carbon atoms. As the carbalkoxy radical COOR$_6$, preferably the carbomethoxy or carboethoxy radical is used.

The process of the invention is carried out at temperatures in the range of from —40° C. to —80° C., preferably at —50° C., in the presence of an inert solvent, especially of an either. Tetrahydrofuran is preferably used. During the process, any aldehyde group possibly present ($R_7$=formyl) is reduced to the alcohol group.

The process of the invention is surprising since it could not be expected that it would be possible to reduce the carboxylic acid ester group selectively with LiAlH$_4$, without simultaneously affecting the sensitive butenolide group.

The products obtained according to the invention have valuable pharmacological properties. For example, they have inotropic, cardiovascular, diuretic and anti-diarrheal effects and may therefore be used as medicaments for the treatment of cardiac diseases as well as renal and intestinal diseases. They are preferably administered orally in the form of tablets or dragées. Moreover, they may be used as intermediary products for the manufacture of medicaments.

The following examples illustrate the invention, but they are not intended to limit it thereto:

EXAMPLES (1) Digitoxigenin-3β-[2′, 3′, 4′-tridesoxy-5′-methyl-pyranoside]

(a) 750 mg. of digitoxigenin-2′-methyl-2′-carbomethioxy; tetrahydropyranyl ether in 7.5 ml. of tetrahydropyran were stirred for 10 hours at −50° C. with 300 mg. of LiAlH₄. Then 2 ml. of ethyl acetate and subsequently 0.75 ml. of glacial acetic acid and 2.5 ml. of water were slowly added. After heating to room temperature the mixture was suction-filtered and the filtrate was evaporated to dryness under reduced pressure. The residue was extracted with ether, the ether solution was shaken with dilute sodium carbonate solution and dried with sodium sulfate. Evaporation of the ether yielded digitoxigenin-3β-[2′,3′,4′-tridesoxy-5′-methyl - pyranoside] in amorphous form.

For purification the product was chromatographed on 10 g. of silica gel. The eluate obtained with methylene chloride/10% acetone was evaporated and the residue recrystallized from ether. The melting point of the product was 176–177° C.

In an analogous manner, there were produced:

(b) Gitoxigenin 3-[2′,3′,4′-tridesoxy-5′-methylpyranoside]

(c) Digoxigenin 3-[2′,3′,4′-tridesoxy-5′-methylpyranoside]

(d) Periplogenin 3-[2′,3′,4′-tridesoxy-5′-methylpyranoside]

(e) Uzarigenin 3-[2′,3′,4′ - tridesoxy-5′-methylpyranoside].

The digitoxigenin - 3β-2′-methyl-2′-carbomethoxy-tetrahydropyranyl ether serving as starting material for (a) was prepared as follows:

One drop of POCl₃ was added to 1 g. of digitoxigenin and 0.8 g. of 2-carbomethyl-2-methyl-3,4-dihydro - 2H-pyran (obtained according to J. Am. Chem. Soc. 73, 5270 (1951)) in 5 ml. of tetrahydrofuran while cooling with ice; the mixture was stirred for 60 hours at 0° C. and after the addition of a further 0.2 g. of dihydropyran ester, again stirred for 5 hours at room temperature.

After adding 30 ml. of ether, the reaction mixture was shaken with 50 ml. of 0.2 N-sodium carbonate solution, dried and evaporated. The ether residue was dissolved in methylene chloride and filtered through 5 g. of kieselguhr. After evaporation of the methylene chloride, digitoxigenin-2′-methyl - 2′-carbomethoxytetrahydropyranyl ether in amorphous form was obtained.

The starting substances for (b) to (e) were prepared in an analogous manner.

(2) Strophanthidol-3β-[2′,3′,4′-tridesoxy-5′-methylpyranoside]

1.8 g. of strophanthidin-3β-[2′-methyl-2′-carbomethoxytetrahydropyranyl ether] were vigorously stirred for 8 hours in 30 ml. of tetrahydrofuran together with 700 mg. of LiAlH₄, at −50° C. Then, likewise, at −50° C., 5 ml. of ethyl acetate, 2.5 ml. of glacial acetic acid, 12.5 ml. of acetone and 12.5 ml. of water were successively added dropwise. After heating to room temperature, the mixture was suction-filtered and the filtrate was evaporated to dryness in vacuo. The pyranoside was extracted from the residue with methylene chloride, the methylene chloride was evaporated in a rotary evaporator and the pyranoside was obtained in amorphous form (infrared bands at 1 020, 1 620, 1 735, 1 770 and 3 420 cm.⁻¹; $\epsilon_{max}$=216 m$\mu$).

The strophanthidin-3β-2′-methyl - 2′ - carbomethoxytetrahydropyranyl ether used as starting material was prepared as follows:

One drop of POCl₃, was added to 2 g. of strophanthidin and 1.6 g. of 2-carbomethoxy-2-methyl-3,4-dihydro-2H-pyran (produced according to J. Am. Chem. Soc. 73, 5270 [1951]) in 10 ml. of tetrahydrofuran, and stirred for 60 minutes at room temperature. After the addition of 50 ml. of ether, the reaction mixture was shaken with 50 ml. of 0.2 N-sodium carbonate solution, dried and evaporated. The ether residue was dissolved in methylene chloride, absorbed on 20 g. of silica gel and eluted with methylene chloride which contained 10% of acetone. The residue obtained on evaporation was suitable for the further reaction.

We claim:

1. A tridesoxypyranoside of the formula

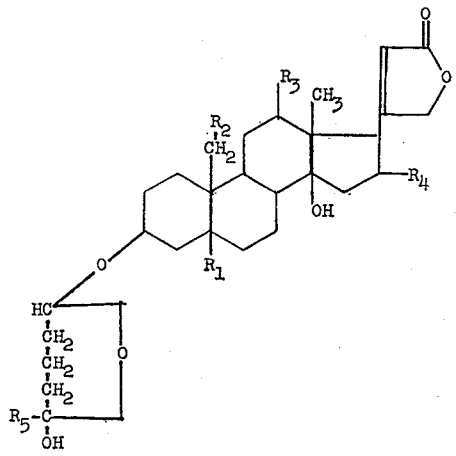

wherein R₁, R₂, R₃, and R₄ are each hydrogen or hydroxy and R₅ is alkyl having 1–3 carbon atoms.

2. Digitoxigenin-3β-[2′,3′,4′ - tridesoxy - 5′ - methyl-pyranoside].

3. Gitoxigenin-3β-[2′,3′,4- - tridesoxy - 5′ - methyl-pyranoside].

4. Digoxigenin-3β-[2′,3′,4′ - tridesoxy - 5′ - methyl-pyranoside].

5. Periplogenin-3β-[2′,3′,4′ - tridesoxy - 5′ - methyl-pyranoside].

6. Uzarigenin-3β-[2′,3′,4′ - tridesoxy - 5′ - methyl-pyranoside].

7. Strophanthidol-3β-[2′,3′,4′ - tridesoxy - 5′ - methyl-pyranoside].

8. A method for making a tridesoxypyranoside of the formula

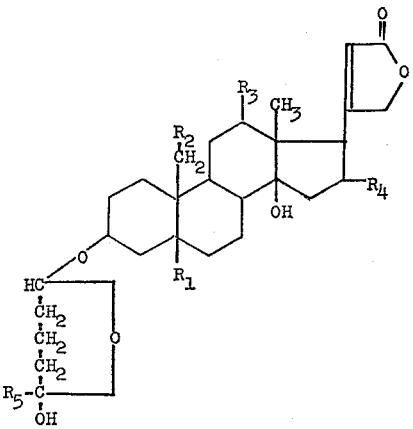

wherein R₁, R₂, R₃, and R₄ are each hydrogen or hydroxy and R₅ is alkyl having 1–3 carbon atoms, which comprises reacting LiAlH₄, at a temperature from −40° to −80° C., with a 2'-alkyl-2'-carboalkoxy-tetrahydropyranyl ether of the formula
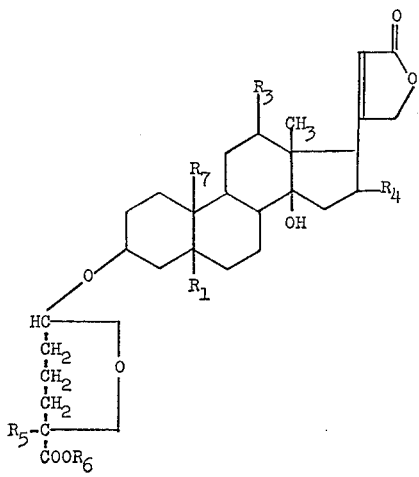
wherein $R_1$, $R_3$, $R_4$, and $R_5$ have their earlier meanings, $R_6$ is methyl or ethyl, and $R_7$ is methyl, hydroxymethylene, or formyl.
References Cited
UNITED STATES PATENTS
| | | | |
|---|---|---|---|
| 2,752,372 | 6/1956 | Reichstein | 260—210.5 |
| 3,462,528 | 8/1969 | Voigtlander et al. | 260—210.5 |
LEWIS GOTTS, Primary Examiner
J. R. BROWN, Assistant Examiner
U.S. Cl. X.R.
260—999